United States Patent
Landvogt et al.

(10) Patent No.: US 7,784,345 B2
(45) Date of Patent: Aug. 31, 2010

(54) DEVICE AND METHOD FOR COMBINED TESTING OF GEARS

(75) Inventors: Alexander Landvogt, Effretikon (CH); Hartmuth Müller, Remscheid (DE); Christian Pahud, Zürich (CH)

(73) Assignee: Klingelnberg AG, Zurich (CH)

( * ) Notice: Subject to any disclaimer, the term of this patent is extended or adjusted under 35 U.S.C. 154(b) by 552 days.

(21) Appl. No.: 11/755,100

(22) Filed: May 30, 2007

(65) Prior Publication Data
US 2007/0277610 A1      Dec. 6, 2007

(30) Foreign Application Priority Data
Jun. 1, 2006   (EP)   ................... 06114835

(51) Int. Cl.
G01N 29/04   (2006.01)
G01M 13/02   (2006.01)

(52) U.S. Cl. ............... 73/587; 73/162; 73/593
(58) Field of Classification Search ........... 73/587, 73/162, 584, 593, 660; 702/113; 74/459.5
See application file for complete search history.

(56) References Cited

U.S. PATENT DOCUMENTS 3,280,624 A * 10/1966 Weinert .................. 73/162
5,663,504 A * 9/1997 Kluft .................. 73/660
6,481,307 B1 * 11/2002 Klingelnberg .............. 74/459.5
7,153,183 B2 * 12/2006 Kopp et al. ................. 451/5
7,376,506 B2 * 5/2008 Schueler ................. 701/114

FOREIGN PATENT DOCUMENTS

EP     1241462 A1     9/2002

OTHER PUBLICATIONS

Single-Flank Test of Gears, Robert E. Smith May/Jun. 2004, Gear Technology.pp. 18-21.*
International Search Report, European Application No. EP06114835, (Oct. 22, 2007).

* cited by examiner

*Primary Examiner*—J M Saint Surin
(74) *Attorney, Agent, or Firm*—McCormick, Paulding & Huber LLP

(57) ABSTRACT

A device (10) for measuring the running behavior of a gear pair having a rolling device (12) which comprises one spindle (15, 16) per gear (13, 14) and has at least one drive (17; 18) for driving one of the gears (13, 14). Furthermore, a structure-borne noise sensor (20), a sequence controller (30), and a speed sensor system (23, 24) are provided. The sequence controller (30) is designed in such way that a combined test of the gear pair may be performed, in which, in a first search run, a specific installation position is ascertained using structure-borne noise testing and subsequently a single-flank working test is performed at the specific installation position.

15 Claims, 4 Drawing Sheets

DEVICE AND METHOD FOR COMBINED TESTING OF GEARS

CROSS REFERENCE TO RELATED APPLICATION

The present invention relates to devices and corresponding methods for testing gears. The priority of the European Patent application EP 06114835.9 is claimed, which was filed on 1 Jun. 2006 in the name of the assignee of the present application.

BACKGROUND OF THE INVENTION

Prior Art

Gears are used in many different technical areas. A first gear typically engages in a second gear. To ensure a desired running behavior, it is important to bring the two gears in relation to one another in a suitable way in a spatial coordinate system upon installation.

The running behavior of gears and gear pairs is essentially determined by the design. Deviations between the setpoint geometry and the actual geometry of the gears result due to the manufacturing errors arising during the gear production, which typically results in a change of the running behavior.

The manufacturing errors influence, inter alia, the bearing capacity, noise level, and replaceability of gears and interfere with the uniformity of the movement transmission.

There are testing methods for testing gears or gear pairs. A differentiation is made in principle between two types of measurement and testing methods; individual-error testing and summation-error testing (also called cumulative-error testing)

The individual-error testing method includes, for example, measuring the gear geometry on a 3-D coordinate measuring machine, in which the deviations between setpoint and actual geometries are determined in micrometers, for example. These deviations are then either output directly as a setpoint-actual difference of individual points or represented in the form of calculated characteristic values, such as a flank line angle deviation.

Individual-error testing has the disadvantage that the interplay of the single deviations of two paired gears and their influence on the running behavior may only be inadequately judged. Because it is finally decisive for the quality judgment of the gears and the gear pairs, however, that the required noise level and fatigue life are achieved, in addition to individual-error measurement, summation-error testing methods are also used, which allow such a judgment.

For this purpose, so-called single-flank working test (SFWT) has established itself most extensively in recent years in the field of bevel gear manufacturing. In single-flank working testing, wheel and counter wheel are rolled on one another quasi-statically in single-flank contact and the single-flank working deviation, or the oscillation of the transmission ratio, is determined. The testing speed is typically in a range from 30 to 200 rpm, to preclude dynamic effects. The testing torque is selected in such a way that the contact of the tooth flanks is ensured.

The oscillation of the transmission ratio results from the design of the tooth system and from manufacturing and installation position deviations. As a result of the transmission oscillation, vibration and noise excitations occur. Conclusions about the running behavior of the gear pair may be made from SFWT.

SFWT may either be performed as a measurement at defined installation positions or as a measurement during a continuous change of the installation position.

In SFWT at a defined installation position, the gearset running behavior is tested and judged for precisely this installation position. Because the installation position of the gearset in the transmission deviates from the setpoint installation position due to geometric errors of the transmission housing and/or due to load-related deformations, changes of the contact conditions in the tooth engagement occur. This means that the tooth flanks contact at a different point during rolling of the gearset than when rolling on the testing stand, which results in a change of the transmission oscillation and thus of the running behavior. To test this so-called displacement sensitivity of the gearset, it is therefore generally typical for the SFWT not to be performed only at one installation position, but rather at multiple positions.

Because such SFWT measurement at multiple positions may take a relatively long time depending on the number of measurement points, the possibility of performing a continuous measurement also exists in modern running test machines. In the continuous method, the installation position of the gear pair is continuously changed in parallel to the measured value detection. Details of a continuous SFWT may be inferred from the patent application having the publication number EP 1 241 462 A1.

In addition to checking the displacement sensitivity, the change of the gearset installation position may also be used to compensate for manufacturing-related deviations of the gearing geometry and their effect on the running behavior. During the assembly of bevel gear transmissions, one typically has the possibility of changing the mounting distance of the pinion in specific limits. Therefore, SFWT is frequently performed at multiple different pinion installation positions in industrial practice and the mounting distance for the subsequent assembly, at which the gearset runs quietest, is ascertained based thereon. For example, the first order of the curve of the shortwave component of the working deviation averaged over a tooth contact is analyzed as a criterion to determine the quietest-running position, as shown in FIG. 1. The installation position of the two gears paired with one another is specified on the horizontal axis in mm and the working deviation is specified on the vertical axis in μrad (microradiant).

The optimum pinion mounting distance—also called best fit—is the (mounting) position at which this parameter reaches its minimum. In the example shown in FIG. 1, this would be the (mounting) position at −0.06 mm.

In addition to SFWT, structure-borne noise testing (SBNT) is used industrially for quality monitoring of the running behavior. Most frequently, an order analysis of the structure-borne noise signal is performed to thus obtain a more precise conclusion about the causes of the noise excitation. SBNT may either be performed sequentially or continuously at multiple installation positions, like SFWT. The testing speed is generally significantly above that of SFWT, at several hundred rpm. Details of continuous SBNT may be inferred from the patent application already cited having the publication number EP 1 241 462 A1.

In addition to structure-borne noise testing, so-called rotational acceleration measurement is also known as a rapid and qualitative testing possibility. Rotational acceleration measurement is also based on a measurement of the structure-borne noise, or the acceleration. In contrast to normal SBNT, in which the sensor is mounted at any point of the spindle, in rotational acceleration measurement, the structure-borne noise sensors are mounted tangentially on the pinion and wheel shafts and rotate with the spindles during the testing. The signal is transmitted using telemetry.

If one compares the advantages and disadvantages of SFWT and SBNT (or rotational acceleration measurement), the following core statements may be made. SFWT is a testing method whose results are very well reproducible because of the quasi-static testing parameters, but the measurement time is relatively long. In the scope of reproducibility tests, it has been shown that the scattering of the first order of the tooth engagement is less than 2 microradiant.

In contrast to SFWT, SBNT (or rotational acceleration measurement) is a dynamic testing method whose testing time is significantly shorter than that of SFWT. However, this advantage is opposed by a lack of reproducibility of the testing methods. The cause of this is that the results of SBNT (or rotational acceleration measurement) are not only a function of the properties of the gearset, but rather also the chucking means and the oscillation properties of the testing or measuring machine. A further disadvantage of SBNT (or rotational acceleration measurement) is seen in that SBNT (or rotational acceleration measurement) is a function of the current chucking of the gear pair and frequently different results are obtained for the same gear pair on different measuring devices.

In regard to quality testing with a secure process, the advantages are thus clearly on the side of SFWT. However, SFWT is unfortunately relatively time-consuming, as noted.

To ensure that only gears and gear pairs which correspond to the requirements, for example, in regard to noise level, are installed in the gear assembly, corresponding monitoring of the manufacturing quality is necessary. The methods known up to this point now are either too imprecise and do not provide reproducible results, or they are time-consuming and are therefore only suitable in a limited way for use in manufacturing.

The object thus results of developing a measuring approach which allows more rapid and reliable ascertainment of the suitable installation position of gearset pairs or rapid and reliable quality testing of gearset pairs.

It is a further object of the present invention to provide a measuring system which is capable of the rapid and reliable ascertainment of the suitable installation position of gearset pairs or the rapid and reliable quality testing of gearset pairs.

It is a further object of the present invention to provide a method, a device, an analysis unit, and a software module which is/are capable of ascertaining a suitable installation position for the installation of gearset pairs as rapidly and reliably as possible.

It is a further object of the present invention to provide a method, a device, an analysis unit, and a software module which is/are capable of performing a quality test of gearset pairs as rapidly and reliably as possible.

SUMMARY OF THE INVENTION

The object is achieved according to the present invention by a device for measuring the running behavior of a gear pair or gearset having a rolling device, which comprises one spindle per gear and has at least one drive for driving one of the gears, a structure-borne noise sensor and a sequence controller. The device also comprises a speed sensor system, and the sequence controller is designed in such a way that a combined test of the gears may be performed. In a first search run, a specific installation position is ascertained using structure-borne noise testing or rotational acceleration measurement and subsequently a single-flank working test is performed at the specific installation position.

The object is also achieved according to the present invention by a method for testing the running behavior of the engaged gears of a gear pair or gearset, in which a structure-borne noise measurement or rotational acceleration measurement is performed in different installation positions of the gears during a rotation of the gears by means of a structure-borne noise sensor. A specific installation position is ascertained from measurement results of the structure-borne noise test or rotational acceleration measurement, which meets at least one predefined structure-borne noise criterion in regard to the running behavior. A single-flank working test is performed using a speed sensor system in the specific installation position of the gears of the same gear pair. A quantitative analysis of measurement results of the single-flank working test is performed, to ascertain whether the running behavior of the gears corresponds to a requirement using a single-flank generating criterion.

Further advantageous embodiments may be inferred from the claims.

BRIEF DESCRIPTION OF THE DRAWINGS

Exemplary embodiments of the present invention are described in greater detail in the following with reference to the drawings. It shows.

DETAILED DESCRIPTION OF THE PREFERRED EMBODIMENTS

Figure 1:
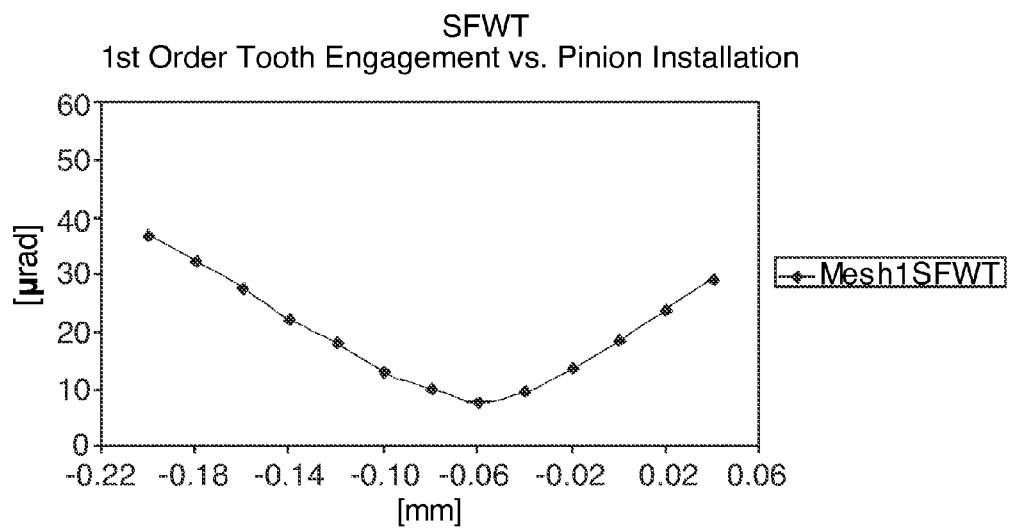
FIG. 1 an exemplary diagram which represents the curve of the shortwave component of the working deviation, which was ascertained using SFWT.

For the sake of simplicity, the present description primarily discusses gearsets and gearset pairs. The term gearset is used in the description as a generic term for all types of gears, such as spur gears, bevel gears (e.g., spiral bevel gears), crown wheels, pinions, etc. The present invention is especially suitable for testing axially-offset and non-axially-offset bevel gears, but may also be used for all other types of gears. It is unimportant whether these are gears having internal or external gearing, or whether the gears have straight, helical, or parabolic teeth.

The present invention may not only be used on gearsets, but rather also on gear pairs (e.g., a gear pair as a combination of "wheel against master wheel" or "pinion against master wheel").

In the present description, the suitable positioning of a gearset pair (e.g., two gears of a gear train) or a gear pair (e.g., wheel against master wheel) is discussed multiple times. It is to be noted that the suitable positioning may be a function of various requirements. If it is a bevel gear transmission which is intended for installation in a utility vehicle, for example, other criteria are applied in the judgment than for a bevel gear transmission for installation in a small car. In addition, every user has different requirements or definitions which are used when ascertaining the suitable positioning of gearset pairs and/or in their quality testing. Moreover, other criteria may play a role if a wheel against a master wheel or a pinion against master wheel is to be tested.

In the present description, structure-borne noise testing is discussed multiple times. The term structure-borne noise testing is to cover both normal structure-borne noise testing, i.e., testing in which the structure-borne noise sensor is mounted at any point of the spindle, and also the rotational acceleration measurement cited at the beginning. In other words, rotational acceleration measurement is viewed as a rapid and qualitative alternative to normal SBNT and may correspondingly also be used as an alternative in connection with the present invention.

A suitable installation position (best fit) may be provided, for example, when the structure-borne noise is lowest, a low structure-borne noise normally ensuring good noise level. Other areas of use possibly dictate other requirements in regard to the suitable installation position. Thus, for example, the operational reliability may be an important criterion in defining the suitable installation position.

In working testing, as described at the beginning, gearings are paired with counter gearings and the joint effects of their individual deviations on the working procedure are ascertained as working deviations. In single-flank working test, two gears are engaged at constant axial distance a. The left flanks or the right flanks are continuously in contact. A brake on the output or a drive which generates a negative torque ensures contact of the tooth flanks at all times. At least 1 rotation of the gear having the largest tooth counts of the pairing is needed for measuring a gear pair and operation is only possible at low speeds. This means such SFWT is relatively time-consuming. Up to this point, SFWT has had to be performed before the gear assembly, however, to ascertain the best suitable installation position (best fit).

Figure 2:
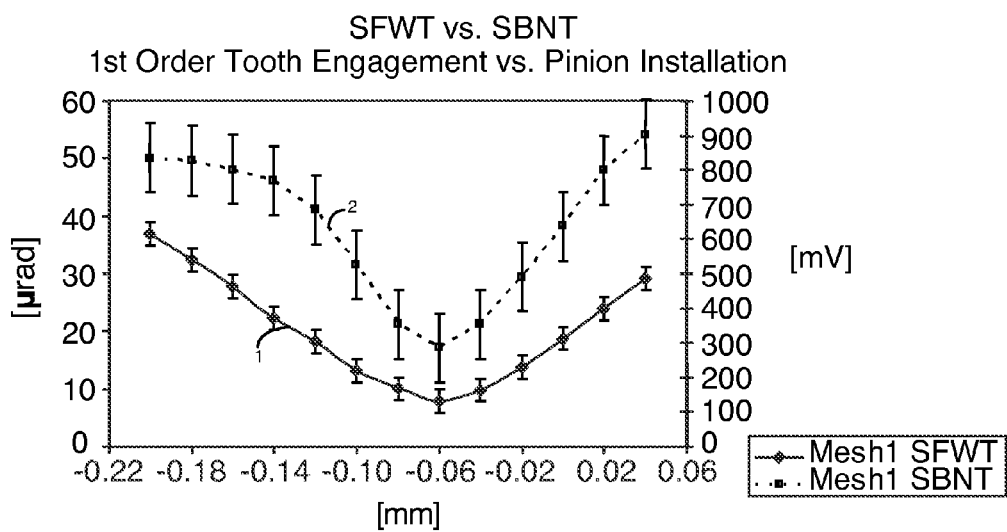
FIG. 2 a further exemplary diagram which represents the curve of the shortwave component of the SFWT working deviation and the curve of a polygon traverse measured using SBNT.

The present invention is now based on the following finding. If one compares the measurement results of a continuous SFWT to those of a continuous SBNT (or a rotational acceleration measurement), certain correspondences may interestingly be established, as may be seen on the basis of FIG. 2. However, these correspondences are only visible if the measurements are performed suitably and the measurement results are graphed in a suitable way. The measurement result of the SFWT is shown as a solid line 1 and the measurement result of the SBNT is shown as a dashed line 2 in a diagram in FIG. 2. Both measurements were performed on the same gear pair on a measuring machine which is designed for both SBNT and also SFWT. The installation position of the two gears paired with one another is specified in mm on the horizontal axis and the working deviation of the SFWT measurement is specified in μrad (microradiant) on the vertical axis. In the example shown, the horizontal axis is divided into 0.02 mm steps, because 0.02 mm thick underlay disks or spacer disks will be used during the later installation of the gears. In addition to the SFWT and SBNT measured points, the scatter range for the individual measured points is also shown in the illustration using vertical bars. The scattering is approximately 2 μrad (microradiant) in an SFWT reproducibility test. The results of the structure-borne noise scattering, in contrast, are frequently scattered by 100 mV and more, as shown in FIG. 2. The representation of the structure-borne noise in the form of mV is not physically correct and has to be specified as an acceleration value (as a fraction of the acceleration of gravity g); however, in industrial practice, a corresponding calibration of the measurement signal is typically dispensed with and the results are output directly as the measured voltage. Instead of using mV or g to represent the structure-borne noise, a so-called quality factor (also referred to as a Q value) may also be used. The Q values may be ascertained by software using a formal relationship and by weighting factors selectable by the user.

In spite of the large scattering of the SBNT results, it may be seen on the basis of the special illustration shown in FIG. 2 that the qualitative curve of SFWT line 1 and SBNT line 2 correspond quite well with one another. The minimum of the first order of the tooth engagement is at the relative pinion installation position −0.06 mm in both cases.

This finding is used according to the present invention to provide novel testing methods and corresponding devices. A combined approach has been developed by the inventors to combine the advantages of both methods with one another without having to accept their disadvantages, which is to be explained in the following on the basis of examples.

According to the present invention, usage is made on one hand of the relatively short measuring cycle (in the meaning of duration) of a SBNT and on the other hand of the quantitative precision of SFWT.

According to the present invention, after the production, or before the installation, of crown wheels and pinions of a specific design, a structure-borne noise analysis is performed to find the optimum mounting distance in regard to the noise emission (this procedure is also referred to as a search run herein). In a following step, SFWT is performed, this SFWT either being executed in a narrow window which has been found using SBNT, or only being performed at the specific installation position ascertained by SBNT. Single-flank working test is an absolute measuring method which permits more precise quantitative statements than SBNT.

In other words, firstly a search run is done to ascertain a suitable installation position (referred to as a specific installation position here) on the basis of a qualitatively operating SBNT and then a quantitative SFWT is only performed at one point (specific installation position) or in a small range which comprises this point.

In a preferred implementation of the present invention, other criteria are also considered in the SBNT. For example, if the ascertained polygon traverse does not show a curve which is similar to the curve shown in FIG. 2, it may be assumed that other problems (such as instability) exist and the wheel pair is unsuitable for pairing. In this case, the search run is interrupted and the wheel pair is not permitted to be installed.

It is obvious that only those gearsets which have successfully passed through the novel testing process are installed as a pair.

Figure 3A:
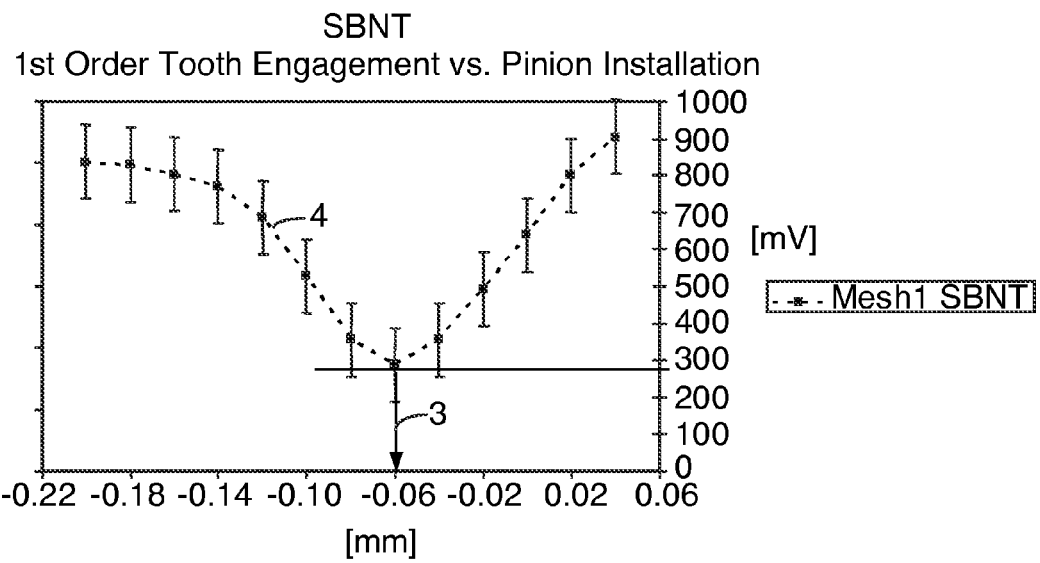
FIG. 3A an exemplary diagram which illustrates a first step of a method according to the present invention.
Figure 3B:
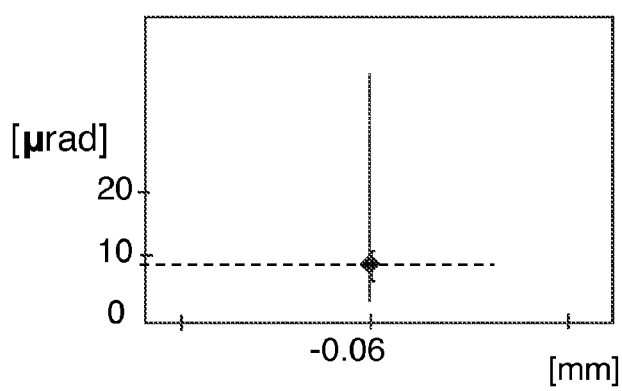
FIG. 3B an exemplary diagram which illustrates a second step of the method according to the present invention.

A method according to the present invention will now be explained in greater detail in the following on the basis of FIGS. 3A and 3B. The method for testing the running behavior of the gears of a gear pair is described in these two figures. In a first step, a (qualitative) structure-borne noise test (or rotational acceleration measurement) is performed on the basis of a structure-borne noise sensor at various fixed predefined installation positions of the gears. During this structure-borne noise test, the gears rotate at a speed of 1000 rpm, for example. Either various discrete installation positions (e.g., as pinion position distance in 0.02 mm steps) are set to measure the structure-borne noise there in each case, or a range is continuously run through while the structure-borne noise is measured. For example, value pairs are recorded to allow an assignment (correlation) of the measurement results ascertained from the structure-borne noise to the particular installation position. In the present example, it is established as a structure-borne noise criterion that the absolute minimum of the structure-borne noise is to be ascertained. For this purpose, the value pairs are compared to ascertain the smallest structure-borne noise value, or the slope of the curve 4 is ascertained and the minimum is found by ascertaining the zero point. As indicated by an arrow 3 pointing vertically downward in FIG. 3A, the associated installation position is ascertained at the minimum. This installation position is also referred to as the specific installation position. The specific installation position (best fit position) is at −0.06 mm.

A single-flank working test is now preferably performed on the same measuring system or device using a speed sensor system. It is performed according to the present invention precisely at the specific installation position of the gears, i.e., in the present example precisely at −0.06 mm. The result of such a local single-flank working test is shown in FIG. 3B. The SFWT provides a measured value of approximately 8 μrad. This measured value allows a quantitative statement about the single-flank working test. A so-called single-flank working criterion may be used. In the present example, it is established as a single-flank working criterion that the measured value of the SFWT must be less than 10 μrad. For this purpose, the measured value is compared to the single-flank working criterion to determine that the single-flank working criterion is maintained. In another embodiment, for example, the slope of a measured curve may be ascertained and the minimum may be found by ascertaining the zero point. The installation position thus found is also referred to as the ideal installation position. The ideal installation position is at −0.06 mm.

Figure 4A:
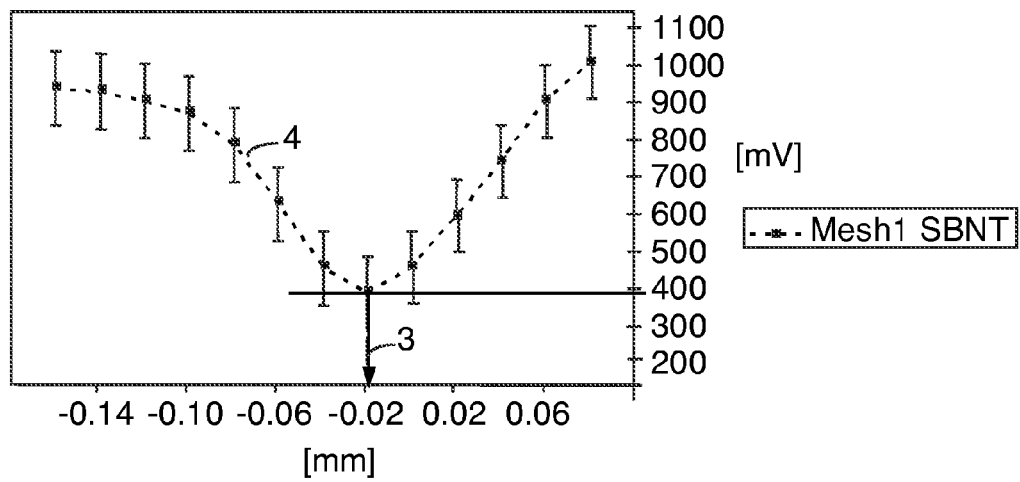
FIG. 4A an exemplary diagram which illustrates a first step of a further method according to the present invention.
Figure 4B:
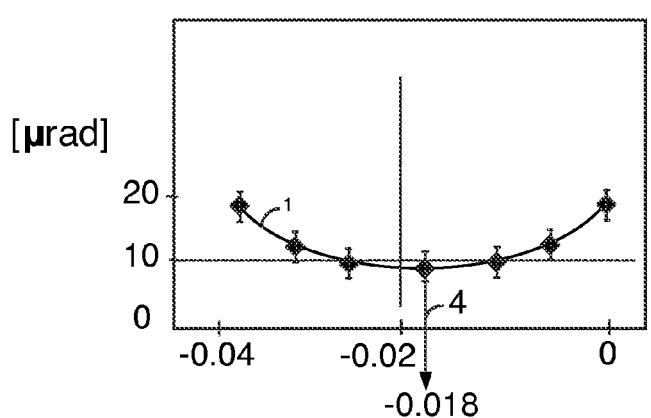
FIG. 4B an exemplary diagram which illustrates a second step of the further method according to the present invention.

A somewhat modified method according to the present invention is explained in the following on the basis of FIGS. 4A and 4B. In a first step, a structure-borne noise test is performed at various installation positions of the gears on the basis of a structure-borne noise sensor. During this structure-borne noise test, the gears rotate at a speed of 800 rpm, for example. Either various discrete installation positions are set to measure the structure-borne noise in each case, or a range is continuously run through while the structure-borne noise is measured. For example, value pairs are recorded to allow an assignment of the measurement results to the particular installation position. In the present case, it is established as a structure-borne noise criterion that the absolute minimum of the structure-borne noise is to be ascertained. For this purpose, the value pairs are compared to ascertain the smallest structure-borne noise value, or the slope of the curve is ascertained and the minimum is found by ascertaining the zero point. As indicated by an arrow 3 pointing vertically downward in FIG. 4A, the associated installation position is ascertained in the minimum. This specific installation position is at −0.02 mm in the example shown.

A single-flank working test is now preferably performed on the same measuring system or device using a speed sensor system. This is performed according to the present invention in the range of the specific installation position of the gears. In FIG. 4B, the result of such a local single-flank working test is shown. The SFWT was restricted to a small range on the right and left of the specific installation position. There is now a quantitative analysis of the measurement results (or the curve 1) of the single-flank working test. The single-flank working criterion is used. In the present example, it is established as the single-flank working criterion that the absolute minimum of the measurement results (or the curve 1) of the SFWT is to be ascertained. For this purpose, the values are compared to ascertain the smallest measured value, or the slope of the curve 1 is ascertained and the minimum is found by ascertaining the zero point. As indicated by an arrow 4 pointing vertically downward in FIG. 4B, the associated installation position is ascertained in the minimum. This installation position is also referred to as the ideal installation position. The ideal installation position is at −0.018 mm. Simultaneously, for example, it may optionally be checked whether the absolute measured value in μrad is below 10 μrad (requirement).

If the ideal installation position thus ascertained is not an element of the set of permanently predefined installation positions, the closest installation position may be used. In this case, the set of permanently predefined installation positions comprises the following values: 0.06 mm; 0.04 mm; 0.02 mm; 0 mm; −0.02 mm; −0.04 mm. −0.06 mm. Because −0.018 mm is closer to −0.02 mm than to 0 mm, the value −0.02 mm is selected as the installation position.

In this example, the ideal installation position may thus be ascertained more precisely than would be possible using pure SBNT or rotational acceleration measurement, but without losing too much time for the precise measurement.

The single-flank working criterion may be used to ascertain whether the running behavior of the gear pair just tested corresponds to the predefined conditions (requirements) (e.g., of the producer).

In a further preferred embodiment, there is a type of "zoom-in" function. One proceeds as follows. Initially, the search run is performed using the structure-borne noise sensor 20 at discrete installation positions and the measurement results of the structure-borne noise test are immediately analyzed (on the fly) to establish an approximation of the structure-borne noise criterion. From an installation position thus ascertained, there is a transition from a discrete structure-borne noise measurement (or rotational acceleration measurement) to a continuous structure-borne noise measurement (or rotational acceleration measurement) and a higher-resolution, continuous structure-borne noise measurement (or rotational acceleration measurement) is performed in the surroundings of the point thus found. The single-flank working test is only performed then, as already described.

Figure 5:
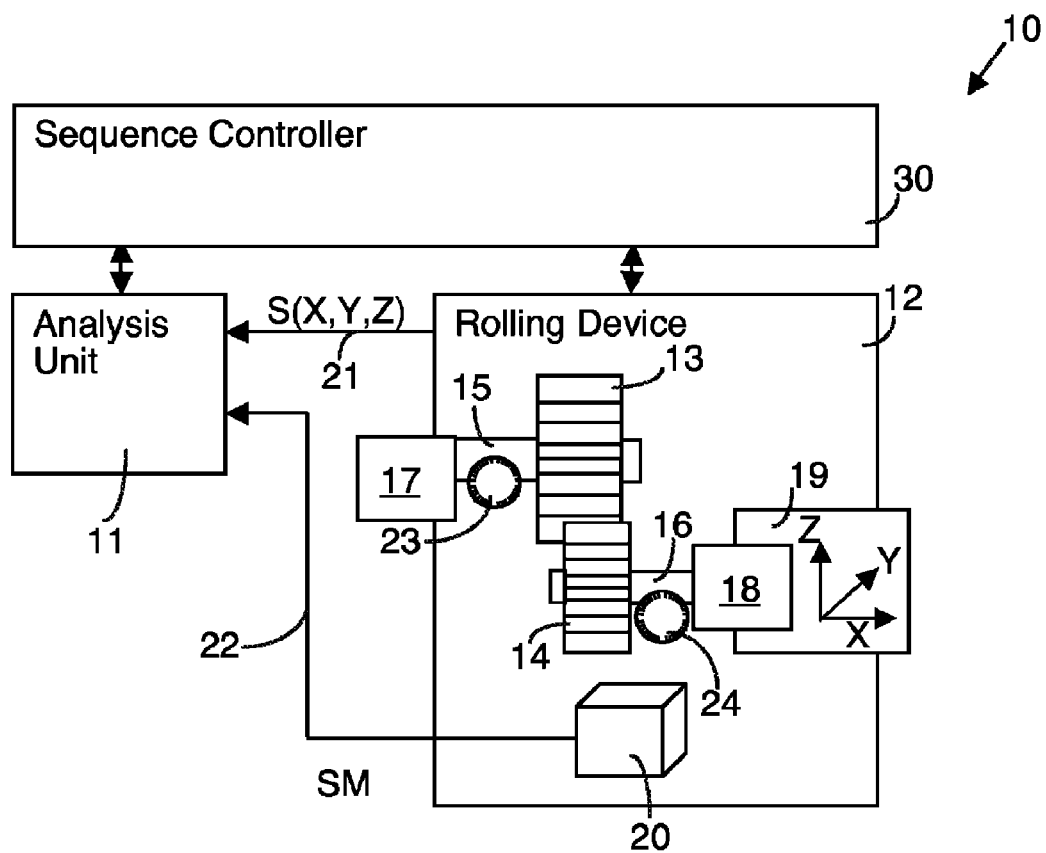
FIG. 5 an exemplary, schematically illustrated system according to the present invention.

A first exemplary embodiment of the present invention is described on the basis of the schematic illustration in FIG. 5. A measuring system or device 10 is shown in this figure, which essentially comprises an analysis unit 11, a rolling device 12, and a sequence controller 30. A system 10 of this type may be used, for example, for testing a gear pair 13, 14. In the testing according to the present invention, a suitable (preferably the best possible) positioning of the first gear 13 in relation to the second gear 14 is ascertained.

The rolling device 12 shown comprises a first spindle 15 to which the first gear 13 may be attached. The first spindle 15 is set into rotation around the spindle axis by a drive 17. The second gear 14 is seated on a second spindle 16. A second drive 18 is provided on the second spindle 16 to impinge the second spindle 16 either with a positive (traction state) or a negative torque (thrust state). To be able to engage the two gears 13 and 14, the rolling device has a positioning unit 19, which may be used for the purpose of changing the positioning of the two gears 13, 14 in relation to one another in a targeted way. As graphically indicated by the X,Y,Z coordinate system, the positioning may be performed in three-dimensional space. The position of the two gears 13 and 14 may be described in the Cartesian coordinate system, or in some other suitable coordinate system.

Because it is not essential to the present invention which coordinate system is used for describing the position of the gears 13, 14, in the following, the terms positioning and installation position are primarily used, which is to indicate that in the final analysis, the position of one gear 13 in relation to the position of the other gear 14 is important.

The rolling system 12 shown is capable of transmitting signals S(X,Y,Z) via a communication link 21 to the analysis unit 11. The signals S(X,Y,Z) describe the positioning of the gearset pair to be tested. The use of the symbols X,Y,Z is to indicate that the positioning may also be described here by the coordinates of a coordinate system. Furthermore, the rolling device 12 comprises a measured value transducer 20, which transmits a time-dependent measured signal SM(t) via a communication link 22 to the analysis unit 11. The communication link 22 is preferably a link via a shielded cable. Depending on the embodiment of the present invention, it may be an active or passive structure-borne noise sensor 20, for example. Such a structure-borne noise sensor 20 generates an analog time-dependent measured signal SM(t), which provides information about the noise behavior and/or the acceleration of the two gears 13, 14 while they roll against one another. The structure-borne noise sensor 20 thus measures the oscillation or acceleration behavior and thus permits a statement about the behavior of the subjects 13, 14. The signal SM(t) of the structure-borne noise sensor 20 is typically proportional to the forces acting thereon and is preferably processed by a measurement amplifier and/or other components for signal adaptation. The amplifier may either be connected upstream from the analysis unit 11 or integrated therein. As schematically illustrated in FIG. 5, in addition to the measured value transducer 20, a rotary transducer 23 or 24 is provided on each spindle 15, 16. This is preferably a high-resolution rotary transducer.

Figure 6:
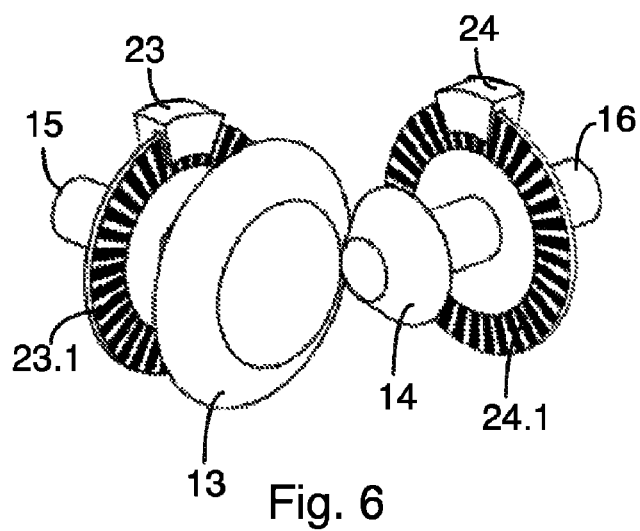
FIG. 6 a partial aspect of a system according to the present invention.

Details on the typical configuration of two rotary transducers 23 and 24 may be inferred from FIG. 6, two bevel gears 13, 14 being shown in this figure instead of two cylindrical gears (see FIG. 5). As shown in FIG. 6, the rotary transducers 23, 24 may be coupled directly to the spindles 15 and 16, respectively. The optical disks 23.1, 24.1 of the rotary transducers 23, 24 shown preferably have a resolution of several thousand pulses. The rotary transducers 23, 24 may, for example, provide the channels A1, B1 and A2, B2 for counting pulses and recognizing position and rotational directions, which are typical for pulse transducers. The rotary transducers 23, 24 may either be mechanically connected to the spindles 15, 16, as shown, or may be inductively or optically coupled thereto.

In addition to the components described up to this point, the system 10 has a sequence controller 30 (preferably software-based), which is preferably capable of executing the following steps:

Moving the gears 13, 14 toward one another until they are engaged and a starting position (also referred to as a zero position) is reached.

Driving one of the two gears 13 or 14 to set it into a rotational movement in which the two gears 13, 14 roll against one another. The gears 13, 14 may be driven at a constant speed n (e.g., n=800 or 1000 rpm), or at a speed n(t) changing over time.

Moving the gears 13, 14 toward one another, the movement being predefined by a movement vector (1, 2, or 3-dimensional). As the gears 13, 14 are moved, depending on the embodiment of the present invention, either multiple installation positions may be approached as discrete, permanently predefined positions, or a continuous movement of the installation position may be performed.

Performing the structure-borne noise testing at various discrete installation positions or continuously, as described. Then, as described, a specific installation position is ascertained (as described in connection with FIG. 3A or FIG. 4A) and the gears 13, 14 are quantitatively measured on the basis of an SFWT precisely at this installation position (as described in connection with FIG. 3B) or in a range (as described in connection with FIG. 4B) which comprises the specific installation position. For this purpose, the signals of the rotary transducers 23, 24 in relation to the installation position are detected and analyzed.

The sequence controller 30 according to the present invention may comprise further components, modules, or software routines. For example, a standardization module or a standardization routine may be provided to make structure-borne noise measurements which have been ascertained on various machines comparable. For standardization, the best fit position is also used and the SBNT curves of various SBNT measurements are shifted until the vertical position and the best fit point correspond.

A system according to the present invention allows high-precision and reproducible measurements and analyses of gearset pairs and gear pairs. The present invention may be used especially advantageously in mass production.

The present invention may be implemented on a specially equipped running test machine or measuring machine, e.g., a CNC bevel gear tester. Preferably, the present invention is implemented in such a way that it is capable of mass production testing of (automobile) gearsets. The user of a machine according to the present invention may predefine certain criteria which a gearset has to fulfill before it may be installed.

However, the present invention may also be used to recognize damage to the gears of a gearset or a gear pair in various installation positions.

A machine according to the present invention preferably has three linear axes (for the sake of simplicity, only 2 axes, namely the two spindle axes, are shown in FIG. 5) for setting the gearset mounting distances and the axial offset. Optionally, the machine may be equipped with a positioning axis for changing the axial angle, in order to also be able to test bevel gear sets having an axial angle deviating from 90°. The construction of the machine 10, the sequence controller 30, and its software are preferably designed in such a way that completely automatic run testing of gears sets (e.g., bevel gear sets) using structure-borne noise measurement and subsequent, limited single-flank working test on the basis of a specific installation position ascertained using SBNT is possible under mass production conditions. Depending on the embodiment of the machine 10, this combined measurement may be performed at defined installation positions and/or continuously.

Preferably, a correlation to the specific transmission or vehicle noises is produced by the selection of testing torque, speed, and the available, different structure-borne noise signals. Special analysis software (for example, as a part of the analysis unit 11) permits, according to the present invention, making a statement about good or less good wheel pairs much more rapidly and reliably than before. This is preferably performed, as described, on the basis of stored criteria.

In the preferred case, SBNT measurement runs are performed over multiple pinion mounting distances, e.g., from +0.6 mm to −0.6 mm, to ascertain the installation position which results as the best compromise between thrust and traction sides, and to perform the following SFWT. The following SFWT is then either only performed at the specific installation position or SFWT is performed, for example, in the range of the specific installation position ±0.02 mm (see FIG. 4B).

The following parts may also be judged outstandingly using the combined SBNT and SFWT according to the present invention: e.g., worms, worm gears, bevel gears, spur gears, spin pumps, etc.

It is an advantage of the present invention that very rapid, reproducible, and reliable measurement is made possible by the novel combination of two methods known per se and by the special embodiment of the two methods. Therefore, the enormous cost pressure which exists in mass production may be mediated without obtaining worse pairs. In contrast, the quality of the measurement and the assessment become significantly better, which results in significantly less discards in mass production.

In a preferred embodiment, the device 10 is designed in such a way that it is usable for measuring/judging gear trains having more than two gears. Therefore, entire gear trains may be measured before the final installation.

The invention claimed is:

1. A method for testing the running behavior of the engaged gears of a gear pair or gearset, in which a structure-borne noise measurement or rotational acceleration measurement is performed in different installation positions of the gears during a rotation of the gears by means of a structure-borne noise sensor, comprising the steps of:
ascertaining a specific installation position from measurement results of the structure-borne noise test or rotational acceleration measurement, which meets at least one predefined structure-borne noise criterion in regard to the running behavior,
performing a single-flank working test using a speed sensor system in the specific installation position of the gears of the same gear pair,
performing a quantitative analysis of measurement results of the single-flank working test,
using a single-flank generating criterion to ascertain whether the running behavior of the gears corresponds to a requirement, and
ascertaining a suitable installation position on the basis of the structure-borne noise test or rotational acceleration measurement,
wherein the single-flank working test is only performed at the suitable installation position to establish that the requirement is maintained.

2. The method according to claim 1, further comprising the steps of:
continuously changing the installation position of the gears in relation to one another during the structure-borne noise test or rotational acceleration measurement executed using the structure-borne noise sensor,
detecting the installation position and output signals of the structure-borne noise sensor in synchronization, and
storing the position and output signals to allow an assignment between the measurement results of the structure-borne noise test or rotational acceleration measurement and the particular installation positions.

3. The method according to claim 1, further comprising the steps of:
performing the structure-borne noise test or rotational acceleration measurement executed using the structure-borne noise sensor at discrete installation positions of the gears, and
analyzing the measurement results of the structure-borne noise test or rotational acceleration measurement to establish an approximation of the structure-borne noise criterion, a transition from a discrete structure-borne noise measurement or rotational acceleration measurement to a continuous structure-borne noise measurement or rotational acceleration measurement occurring from the installation position thus ascertained.

4. The method according to claim 1, further comprising the step of:
ascertaining a specific installation position on the basis of the single-flank working test, wherein the specific installation position ascertained on the basis of the single-flank working test is more precise than the specific installation position ascertained from the measurement results of the structure-borne noise test or rotational acceleration measurement.

5. The method according to claim 1, further comprising the step of:
performing a standardization step on the basis of at least one measurement result of the structure-borne noise test or rotational acceleration measurement at or in the range of the specific installation position to make measurement results of structure-borne noise test or rotational acceleration measurement on various structure-borne noise measurement systems or devices comparable.

6. The method according to claim 1, further comprising the steps of:
permanently predefining a number of installation positions, and
correlating measurement results of the structure-borne noise test or rotational acceleration measurement or of measurement results of the single-flank working test to the permanently predefined installation positions to ascertain a best suitable installation position from the number of permanently predefined installation positions.

7. The method according to claim 1, further comprising the steps of:
continuously changing the installation position of the gears in relation to one another during the structure-borne noise test or rotational acceleration measurement executed using the structure-borne noise sensor,
detecting the installation position and output signals of the structure-borne noise sensor in synchronization, and
storing the position and output signals to allow an assignment between the measurement results of the structure-borne noise test or rotational acceleration measurement and the particular installation positions.

8. The method according to claim 1, further comprising the steps of:
performing the structure-borne noise test or rotational acceleration measurement executed using the structure-borne noise sensor at discrete installation positions of the gears, and
analyzing the measurement results of the structure-borne noise test or rotational acceleration measurement to establish an approximation of the structure-borne noise criterion, a transition from a discrete structure-borne noise measurement or rotational acceleration measurement to a continuous structure-borne noise measurement or rotational acceleration measurement occurring from the installation position thus ascertained.

9. The method according to claim 1, further comprising the step of:
performing a standardization step on the basis of at least one measurement result of the structure-borne noise test or rotational acceleration measurement at or in the range of the specific installation position to make measurement results of structure-borne noise test or rotational acceleration measurement on various structure-borne noise measurement systems or devices comparable.

10. The method according to claim 1, further comprising the steps of:
- permanently predefining a number of installation positions, and
- correlating measurement results of the structure-borne noise test or rotational acceleration measurement or of measurement results of the single-flank working test to the permanently predefined installation positions to ascertain a best suitable installation position from the number of permanently predefined installation positions.

11. A device for measuring the running behavior of a gear pair or gearset having a rolling device, which comprises one spindle per gear and has at least one drive for driving one of the gears, a structure-borne noise sensor and a sequence controller,
- wherein the device also comprises a speed sensor system,
- wherein the sequence controller is adapted to perform a combined test of the gears under which, in a first search run, a specific installation position is ascertained using structure-borne noise testing or rotational acceleration measurement and subsequently a single-flank working test is performed at the specific installation position, and
- wherein the drive is designed in such way that at least one of the gears is driven at a first speed during the structure-borne noise test or rotational acceleration measurement and at least one of the gears is driven at a second speed during the single-flank working test, the second speed being in the range from 10 to 1000 rpm and the first speed being greater than 500 rpm.

12. The device according to claim 11, wherein the rolling device is adapted to bring the gears into a spatial relationship to one another in such a way that the structure-borne noise test or rotational acceleration measurement or the single-flank working test is performed at a number of permanently predefined installation positions.

13. The device according to claim 11, further comprising a standardization function, which allows the measurement results of structure-borne noise tests or rotational acceleration measurement, which have been ascertained on various devices, to be standardized using a single-flank working test.

14. The device according to claim 11, wherein the rolling device is adapted to bring the two gears into a spatial relationship to one another in such a way that the structure-borne noise test or rotational acceleration measurement or the single-flank working test is performed at a number of permanently predefined installation positions.

15. The device according to claim 11, further comprising a standardization function, which allows the measurement results of structure-borne noise tests or rotational acceleration measurement, which have been ascertained on various devices, to be standardized using a single-flank working test.

* * * * *